(12) United States Patent
Schmitz et al.

(10) Patent No.: US 7,219,686 B2
(45) Date of Patent: May 22, 2007

(54) TAP ASSEMBLY FOR A LIQUID VESSEL HAVING AN OVERFILL PROTECTION DEVICE AND A FLOAT CONTROLLED MAGNETIC LEVEL GAUGE

(75) Inventors: Jean-Claude Schmitz, Heisdorf (LU); Privat Roderes, Arlon (BE)

(73) Assignee: Torrent Trading Ltd., Tortola (VG)

( * ) Notice: Subject to any disclaimer, the term of this patent is extended or adjusted under 35 U.S.C. 154(b) by 226 days.

(21) Appl. No.: 11/050,489

(22) Filed: Feb. 2, 2005

(65) Prior Publication Data

US 2006/0169325 A1 Aug. 3, 2006

(51) Int. Cl.
*F16K 31/18* (2006.01)

(52) U.S. Cl. .................. 137/413; 137/442; 137/558; 116/229; 73/317; 73/306

(58) Field of Classification Search ................ 137/409, 137/434, 442, 413, 558; 73/305–306, 317; 116/227–229
See application file for complete search history.

(56) References Cited

U.S. PATENT DOCUMENTS

| | | | | |
|---|---|---|---|---|
| 3,688,795 | A | * | 9/1972 | Taylor .................. 137/558 |
| 4,436,109 | A | | 3/1984 | Taylor |
| 4,483,367 | A | | 11/1984 | Ross, Jr. et al. |
| 4,580,450 | A | | 4/1986 | Ota et al. |
| 4,730,489 | A | | 3/1988 | Hoekstra |
| 5,007,450 | A | | 4/1991 | Babb et al. |
| 5,027,871 | A | * | 7/1991 | Guenther .................. 141/198 |
| 5,427,137 | A | | 6/1995 | Bowen |
| 5,479,820 | A | | 1/1996 | Fekete |
| 5,485,866 | A | * | 1/1996 | Bowen .................. 137/554 |
| 5,487,404 | A | | 1/1996 | Kerger |
| 5,641,271 | A | | 6/1997 | Forrester et al. |

(Continued)

FOREIGN PATENT DOCUMENTS

EP 0593085 4/1994

(Continued)

OTHER PUBLICATIONS

Search report for corresponding application EP05104555, dated Jul. 4, 2005.

(Continued)

*Primary Examiner*—Eric Keasel
*Assistant Examiner*—Craig Schneider
(74) *Attorney, Agent, or Firm*—Polster, Lieder, Woodruff & Lucchesi, L.C.

(57) ABSTRACT

This invention relates to a tap assembly for a liquid vessel, having an overfill protection device and a float controlled mechanical or magnetic level gauge. A single float actuates a stem of the overfill protection device as well as a rod of the level gauge. The rod of the level gauge has one end movable linearly in a valve body bore and carrying a permanent magnet for actuating a magnetic level indicator. In one embodiment a crank mechanism may be provided between a float lever and the rod of the level gauge to cause the rod to effectuate a swinging movement and simultaneously displace the rod longitudinally to cause linear displacement of the permanent magnet in the valve body bore. In another embodiment the rod may be actuated by a cam to cause axial displacement thereof without swinging motion.

43 Claims, 14 Drawing Sheets

U.S. PATENT DOCUMENTS

| | | |
|---|---|---|
| 5,701,932 A | 12/1997 | Bourscheid et al. |
| 5,921,272 A | 7/1999 | Cavagna |
| 6,041,650 A | 3/2000 | Swindler et al. |
| 6,640,829 B1 | 11/2003 | Kerger |
| 2002/0117000 A1 | 8/2002 | Housey et al. |

FOREIGN PATENT DOCUMENTS

| | | |
|---|---|---|
| EP | 1617188 A1 | 1/2006 |
| FR | 2587438 | 3/1987 |
| GB | 1093313 | 11/1967 |
| GB | 1177805 | 1/1970 |
| LU | 88646 | 7/1996 |
| WO | 0002015 | 1/2000 |

OTHER PUBLICATIONS

Search report for corresponding application EP05104555, dated Apr. 24, 2006.

* cited by examiner

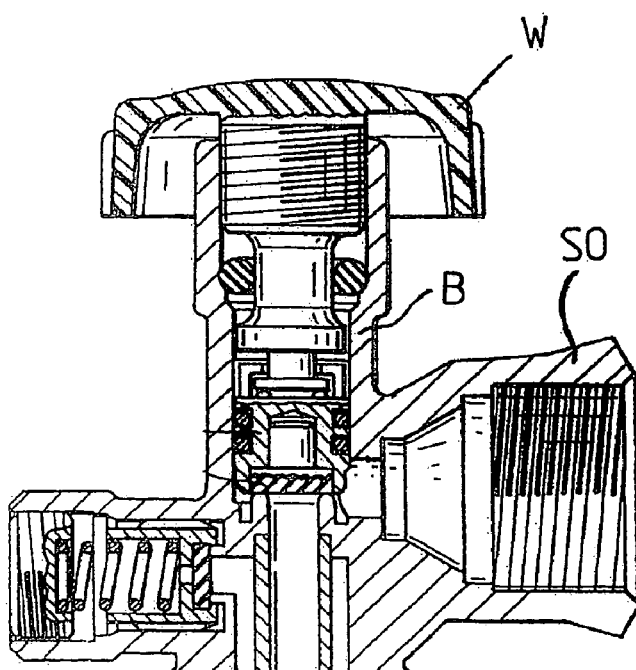
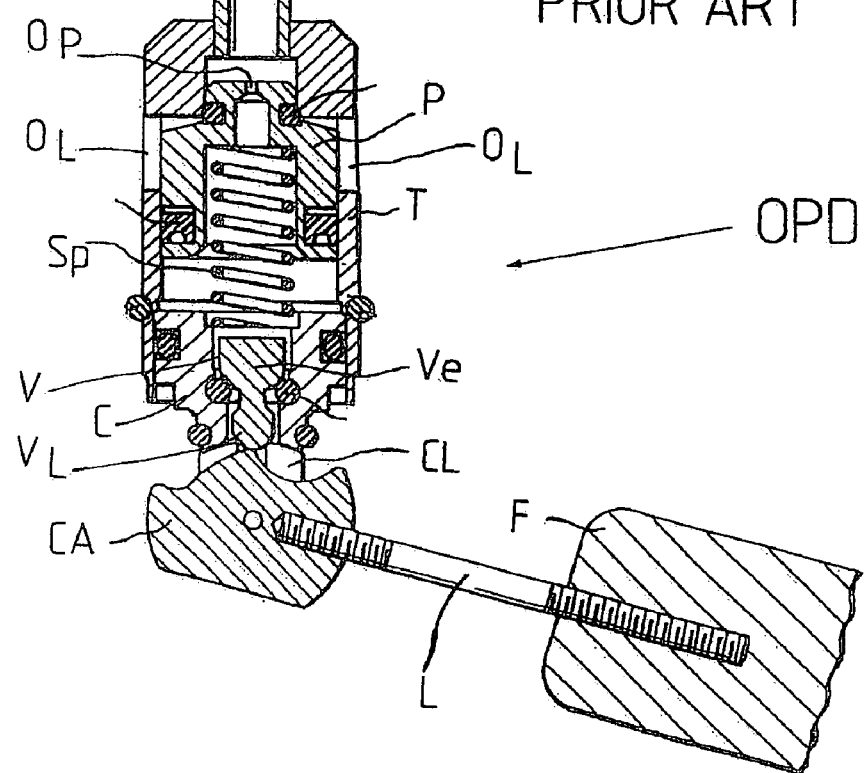
Fig.1
PRIOR ART

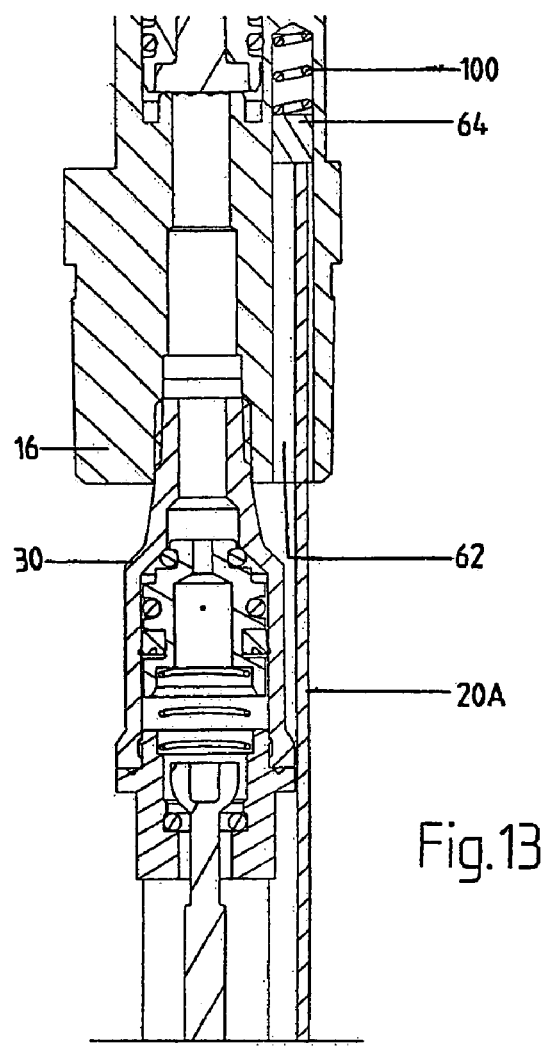
Fig. 13
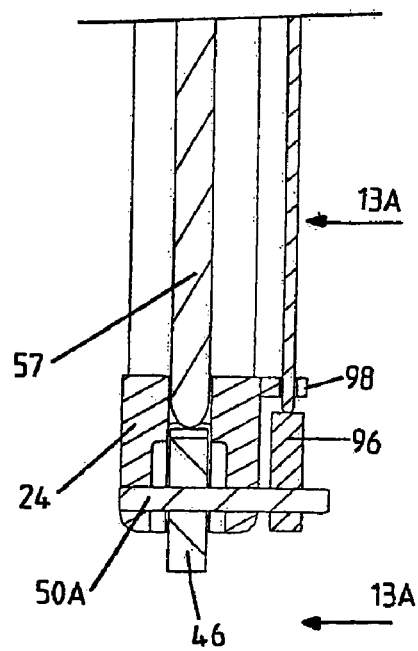
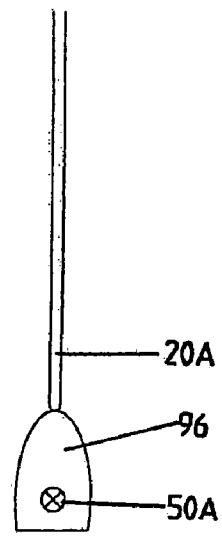
Fig. 13A

TAP ASSEMBLY FOR A LIQUID VESSEL HAVING AN OVERFILL PROTECTION DEVICE AND A FLOAT CONTROLLED MAGNETIC LEVEL GAUGE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a tap assembly for a liquid vessel, especially for a cylinder for pressurized liquefied gas, having an overfill protection device (OPD) to prevent over-filling of the vessel or gas cylinder, as well as a float controlled level gauge for detecting and indicating the level of the fluid or liquefied gas remaining in the vessel or gas cylinder.

A tap for a gas cylinder having an overfill protection device is disclosed for example in U.S. Pat. No. 5,487,404 issued on Jan. 30, 1996 to Leon Kerger and also in U.S. Pat. No. 6,640,829 issued on Nov. 4, 2003 to Loll Kerger, both of which are incorporated herein by reference. Mounted below the body of the gas tap is an overfill protection device (OPD) having a valve element movable into an open position by the liquefied gas to be filled into the gas cylinder and a pivotably mounted float effecting closing of the valve element when the liquefied gas reaches a predetermined maximum level within the gas cylinder.

A gas tap having a capacitive level gauge for detecting and indicating the level of the liquefied gas within a gas cylinder is disclosed, for example, in U.S. Pat. No. 5,701,932 issued on Dec. 30, 1997 to George Burscheid et al. A capacitive level gauge is also disclosed in U.S. Pat. No. 4,730,489 issued on Mar. 15, 1988 to Linze Hoekstra. In co-pending and co-owned U.S. patent application Ser. No. 11/000,655 filed Dec. 1, 2004 to Jean-Claude Schmitz and Linze Hoekstra, which is incorporated herein by reference, there is disclosed a gas valve assembly having an overfill protection device and a capacitive level gauge having lamellar electrodes disposed closely adjacent the OPD for insertion with the OPD through a small diameter opening into a gas cylinder. The known capacitive level sensors are electrical level sensors requiring an electrical power source, such as a battery, which must be replaced from time to time, to ensure operation of the level gauge.

International Application WO 00/02015 discloses a level gauge having a magnetically driven level indicating device. This level gauge has a pivotably mounted float coupled through a gear system to an elongate rod to rotate the rod about its longitudinal axis. The rod carries in a head portion of the gauge a permanent magnet. Rotation of said permanent magnet with said rod actuates a pointer of the indicating device by magnetic force. This known level gauge is not appropriate for use with a tap provided with an overfill protection device. The overfill protection device is dimensioned to fit snuggly through an opening of the vessel and if a level gauge of the type disclosed in WO 00/02015 is added to the assembly of the overfill protection device, the level gauge would no longer be insertable through the vessel opening, unless the diameter of the opening is increased, which is undesirable. Of course, a second opening could be formed in the vessel for a separate level gauge, but providing a second opening in the vessel is also undesirable.

Reference is also made to U.S. Pat. No. 5,479,820 issued on Jan. 2, 1999 to Nicolas M. G. Fekete, which discloses a cryogenic gauge provided with a magnetically actuatable level indicator and having an axially movable stem on which an axially movable float is mounted. The stem carries a magnet at an upper end thereof received within a gauge head. This US patent merely concerns a level gauge but does not relate to a tap for a liquid vessel provided with an overfill protection device.

BRIEF SUMMARY OF THE INVENTION

Briefly, a tap assembly for a liquid vessel, such as a pressurized liquefied gas cylinder, is provided which has an overfill protection device and a float controlled level gauge adapted to be introduced into the liquid vessel through a small diameter access opening, and which does not need electrical power for its operation.

In one illustrative embodiment, a tap assembly for a liquid vessel such as a liquefied gas cylinder comprises:

a tap body having a longitudinal axis and a base end portion for securing said tap in an opening of the liquid vessel;

an overfill protection device comprising:
  a. means for controlling fluid flow into said vessel and discharge of fluid from said vessel;
  b. an elongate support leg secured to said tap body and depending therefrom in the direction of said longitudinal axis;
  c. a float lever having a float fixed thereto, said float lever being pivotable relative to said support leg about a pivot axis oriented generally perpendicularly to said longitudinal axis and located adjacent a free end of said support leg remote from said tap body, said float lever and float being pivotable in response to variations of the liquid level in the vessel between a low minimum level and a high maximum level; and
  d. an elongate actuating stem extending in said support leg in the direction of said longitudinal axis, said stem being axially movable responsive to said float lever reaching a pivot position corresponding to said maximum level to actuate said means for controlling to stop filling of said vessel; and a level gauge comprising:
  a. an elongate gauge rod disposed exteriorly of said support leg and extending alongside said leg closely adjacent thereto, said rod having one of its ends located adjacent the free end of said support leg and the other end of said rod being received and guided for reciprocating linear movement within a bore formed in said tap body, said bore being generally parallel to said longitudinal axis;
  b. motion transmitting means between said float lever and said one end of said gauge rod for longitudinally shifting said rod in response to pivot motion of said float lever and said float caused by variations of said liquid level between said minimum and said maximum level; and
  C. a permanent magnet fixed to said other end of said gauge rod for linear movement with said rod end in said tap body bore to actuate by magnetic force a movable indicator member of a liquid level display means adapted to be mounted to said tap body.

Accordingly, there is provided a tap assembly having a mechanical or magnetic level gauge. A single pivotable float actuates the stem of the overfill protection device as well as the rod of the level gauge. No gear mechanism is used to rotate the rod of the level gauge. The rod of the level gauge can be longitudinally shifted by a simple crank mechanism or cam surface thereby requiring less space than a gear assembly for rotating the rod to permit a compact construction of the overall assembly and to allow for insertion into the vessel through a small vessel access opening. The rod of the level gauge has at an upper end portion thereof received in the tap body a permanent magnet that is axially movable with the rod to actuate by magnetic force a pointer member of an indicator device adapted to be mounted on the tap body. The indicator device is mounted on a side of the tap body and the pointer of the indicator device is rotatable about an axis extending normally or obliquely with respect to the longitudinal axis of the upper end portion of the actuating rod and preferably crossing the longitudinal axis of the upper end portion of the actuating rod in laterally spaced relationship. Preferably, the indicator device is a clip-on indicator device.

In one embodiment the crank mechanism comprises a hinge pin rotatable with the float lever and rotatably mounted to the free end portion of the support leg, the hinge pin carrying a crank arm having a bearing opening in which a cranked journal end of the rod is rotatably received, whereby the lower end of the gauge rod is displaceable with the float lever on a circular arc or path to effect a swinging motion of the gauge rod and simultaneously shift the gauge rod longitudinally while the upper end of the gauge rod moves linearly or axially in the tap body bore.

The crank mechanism for causing swinging motion of the gauge rod may take alternate embodiments, for example the cranked journal arm at the lower end of the gauge rod may be directly engaged in an opening of the float lever which opening is radially spaced from the float lever pivot axis.

In another embodiment the crank arm may be provided with an eccentrically mounted ring engaged in another ring provided at the lower end of an angled lower rod section.

In yet another embodiment the gauge rod may be mounted to remain in a plane containing the longitudinal axis of the tap body, and generally parallel to the support leg and the stem for actuation by a cam rotatable with a pivot pin secured to the float lever. A spring may be provided in the tap body bore to urge the stem downwardly in engagement with the cam.

The support leg has a guide post provided with first and second end portions and two elongate parallel post sections spaced from one another extending between the end portions. The elongate stem is disposed centrally in said guide post and is received between the parallel post sections and guided in a lower post end section to which the float lever is pivotably mounted. A pilot valve element of the overfill protection device is provided at the other end of the elongate stem and received in the upper post end portion for cooperating with a pilot valve seat provided in the upper post end portion.

It is to be understood that, especially for a liquefied gas cylinder application, the tap with the overfill protection device and the level gauge can be mounted to the gas cylinder without the indicator device being mounted on the tap body. The indicator device being assembled with the gas tap after filling of the gas cylinder has been completed.

Although the present invention (the level gauge) has especially been designed for use with a gas tap having an overfill protection device, it is to be understood that the level gauge may also be used in a tap without overfill protection device.

Accordingly, in a further aspect of the invention there is provided a tap assembly for a liquid vessel such as a liquefied gas cylinder, comprising:
  a tap body having a longitudinal axis and a base end portion for securing said tap in an opening of the liquid vessel;
  an elongate support leg secured to said base end portion of said tap body and depending therefrom in the direction of said longitudinal axis;
  a level gauge comprising:
    a. a float lever having a float fixed thereto, said float lever being pivotable relative to said elongate support leg about a pivot axis oriented generally perpendicularly to said longitudinal axis and located adjacent a free end of said leg remote from said base end portion of said tap body, said float lever and float being pivotable in response to variations of the liquid level in the vessel between a low minimum and a high maximum level; and
    b. an elongate gauge rod extending generally in the direction said longitudinal axis and having one of its ends located adjacent the free end of said support leg and the other end of said rod being received and guided for reciprocating linear movement within a bore formed in said tap body, said bore being generally parallel to said longitudinal axis;
    c. motion transmitting means between said float lever and said one end of said rod for longitudinally shifting said rod in response to pivot motion of said float lever and said float caused by variations of said liquid level between said minimum and said maximum level; and
    d. a permanent magnet fixed to said other end of said rod for linear movement with said rod end to actuate by magnetic force a movable indicator member of a liquid level display means adapted to be mounted to said tap body.

BRIEF DESCRIPTION OF THE SEVERAL VIEWS OF THE DRAWINGS

The invention will now be described in greater detail with respect to the drawings, wherein:

FIG. 1 is a vertical sectional view of a prior art gas tap having an overfill protection device (OPD).

FIGS. 13 and 13A show the tap assembly with a third alternate embodiment of the motion transmitting means for longitudinally moving the level gauge rod in response to pivot motion of the float.

DETAILED DESCRIPTION OF THE INVENTION

Referring first to FIG. 1 which shows a prior art tap for a liquefied gas cylinder having an overfill protection device (OPD) disposed below and fixed to the tap body B. The OPD comprises a piston member P axially movable in a tubular member T between an open and a closed position. A pilot valve V is disposed within a closure member C received within the lower end of the tubular member T. A pivotable float F is mounted on a lever L fixed to a cam member CA that is pivotably mounted between two clevis arms CL provided at the lower end of the closure member C. The pilot valve V has a valve element Ve having a lower appendage VL cooperating with a cam surface of the cam member CA. A spring Sp is arranged between the closure member C and the piston member P and forces the piston member P towards its closed position.

A hand wheel W is mounted on the tap body B for opening and closing the tap to permit filling of gas into a gas cylinder on which the tap is mounted or to discharge gas from within the gas cylinder.

For filling pressurized liquefied gas into the gas cylinder, an adapter coupling (not shown) is attached to the lateral socket SO of the tap body B. The hand wheel W is then rotated to open the tap allowing the gas to flow through the tap into the tubular member T thereby forcing the piston member P to its open position against the force of spring Sp to allow liquefied gas to flow into the interior of the gas cylinder through lateral openings OL formed in the tubular member T as well as through an orifice OP in the piston member P and through the pilot valve V which is maintained by the float F and the cam member CA in open position during the filling operation. When the liquid level in the gas cylinder reaches a predetermined level, such as an 80% fill position, the float F pivots the cam member CA into a position in which the pilot valve element Ve drops downwardly and tightly closes under the effect of the pressure of the liquefied gas. Now, the gas pressure can increase between the pilot valve V and the piston member P and forces the piston member P to its closed position. To discharge gas from the vessel the tap is opened by rotating the hand wheel W. This causes the pressure to decrease between the piston member P and the pilot valve V allowing the pilot valve element Ve to open to permit gas flow in the opposite direction through the overfill protection device and the tap and out through the socket SO (the fill adaptor being now removed). The gas tap with overfill protection device as described above as well as the operation thereof, is well known and disclosed for example in U.S. Pat. No. 5,487,404 already referred to hereinbefore and incorporated herein by reference. This known gas tap is not provided with a level gauge.

Figure 2:
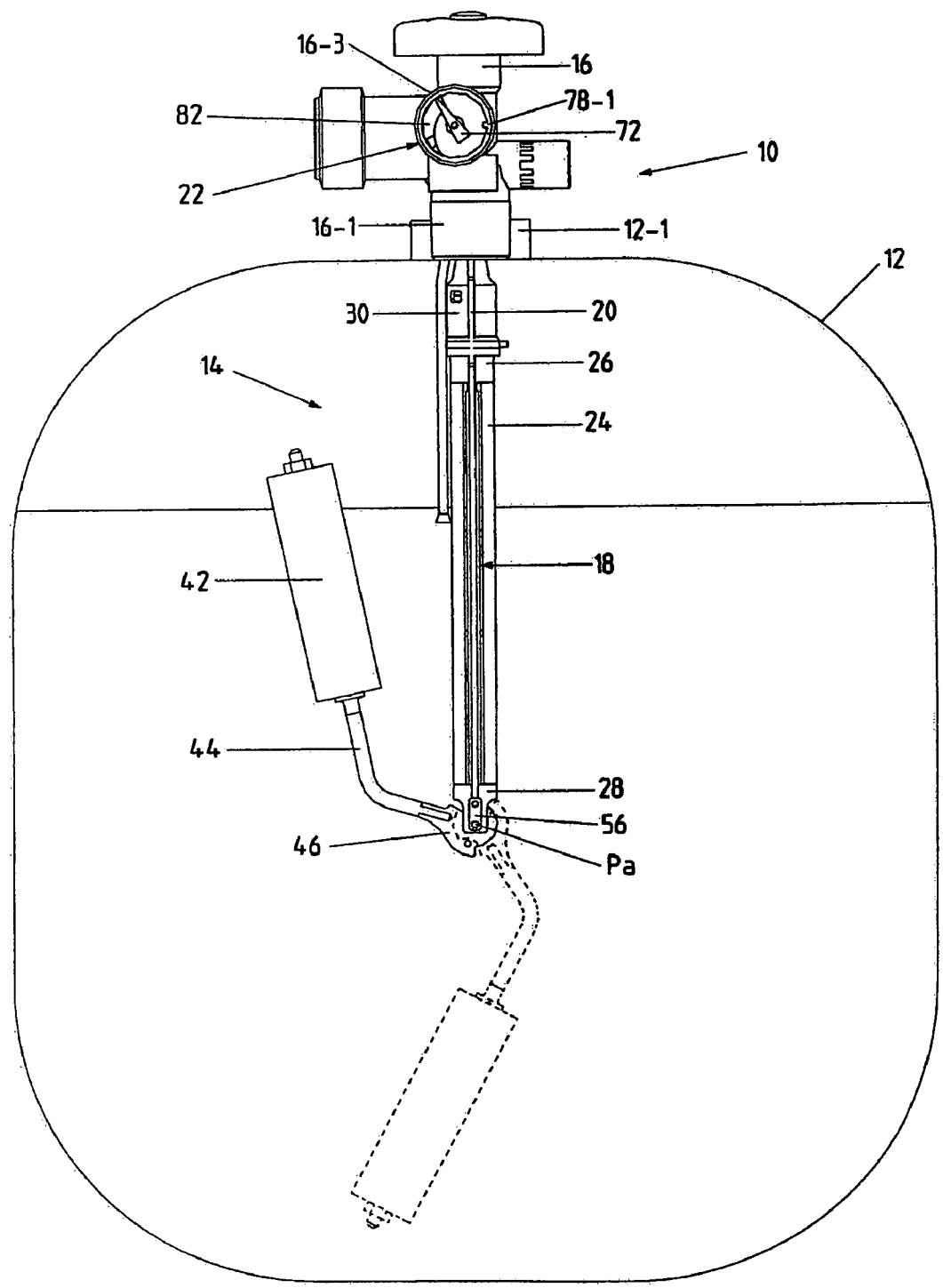
FIG. 2 is an elevational side view of a gas tap assembly according to the invention having an overfill protection device and a level gauge, with the tap fixed to a vessel and the OPD and the level gauge located within the vessel.
Figure 3:
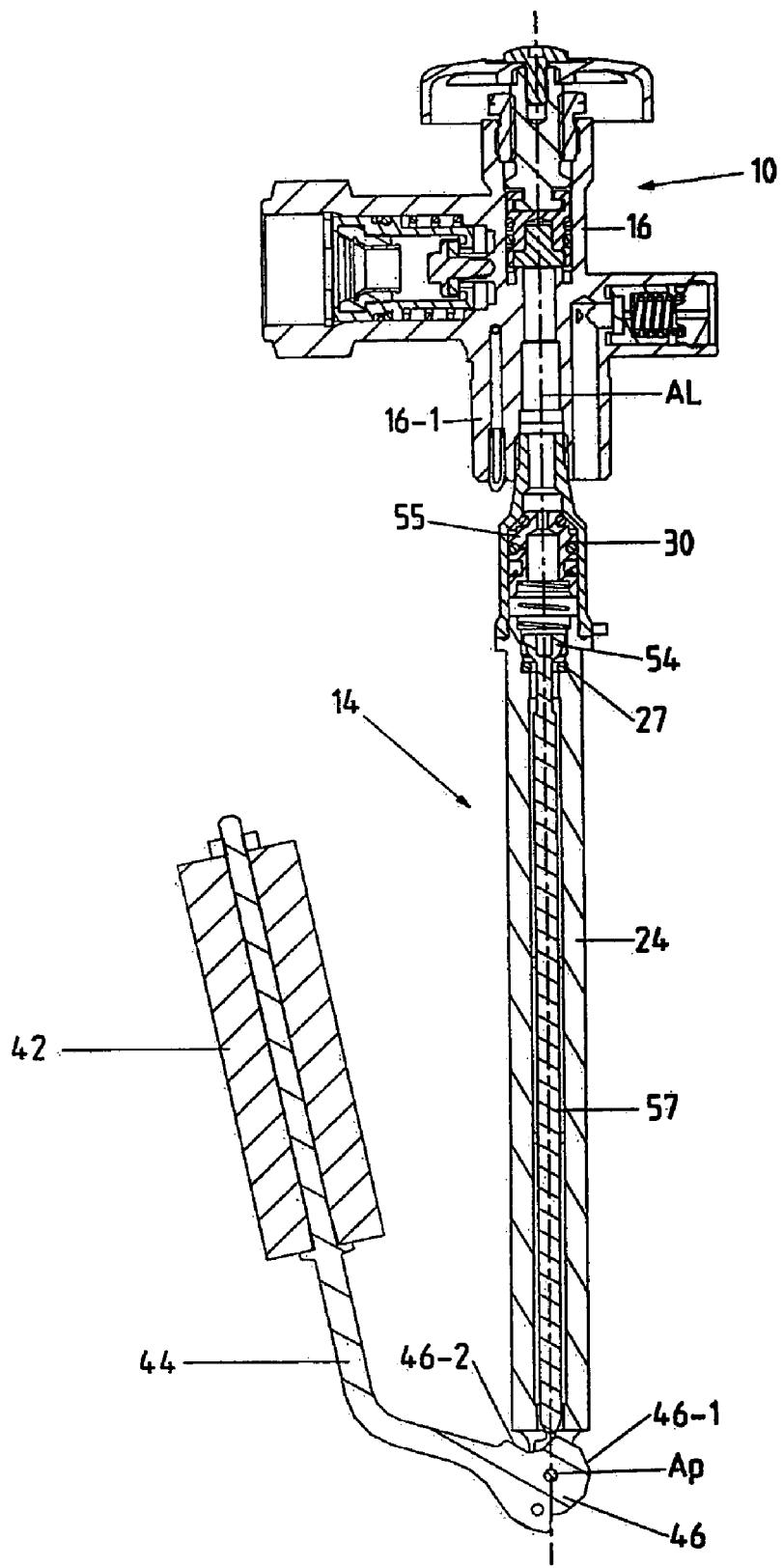
FIG. 3 shows the tap assembly with the overfill protection device in longitudinal section, the level gauge being not shown in this view.

Referring now to FIGS. 2 and 3, a gas tap assembly according to the invention is schematically shown; in FIG. 2 in side elevation and mounted within a schematically represented vessel, and in FIG. 3 in vertical section. In FIG. 2 the gas tap assembly 10 is fixed to the liquefied gas vessel or cylinder 12. An overfill protection device 14 is fixed to the lower end of the gas tap body 16. Further the gas tap 10 has a level gauge 18 comprising a rod 20 and a level indicator 22.

In the sectional view of FIG. 3 the details of the overfill protection device 14 are more clearly shown. The overfill protection device 14 is generally identical to the overfill protection device shown in FIG. 1, but the closure member CA of the overfill protection device OPD (FIG. 1) is replaced by an elongate post 24 extending along the longitudinal axis AL of the tap 10 and overfill protection device 14. The elongate post 24 has an upper annular end portion 26 and a lower end portion 28. The upper annular end portion 26 is fixed to the lower end of the tubular member 30 of the overfill protection device 14, which is in turn fixed to a lower threaded base portion 16-1 of the tap body 16 adapted to be threaded into the gas cylinder opening 12-1, note also FIG. 2.

The lower end portion 28 of the elongate post 24 has two downwardly depending clevis arms 34 and 36 forming a lower bifurcated end portion of lower end portion 28, note FIGS. 4 to 7.

Figure 6:
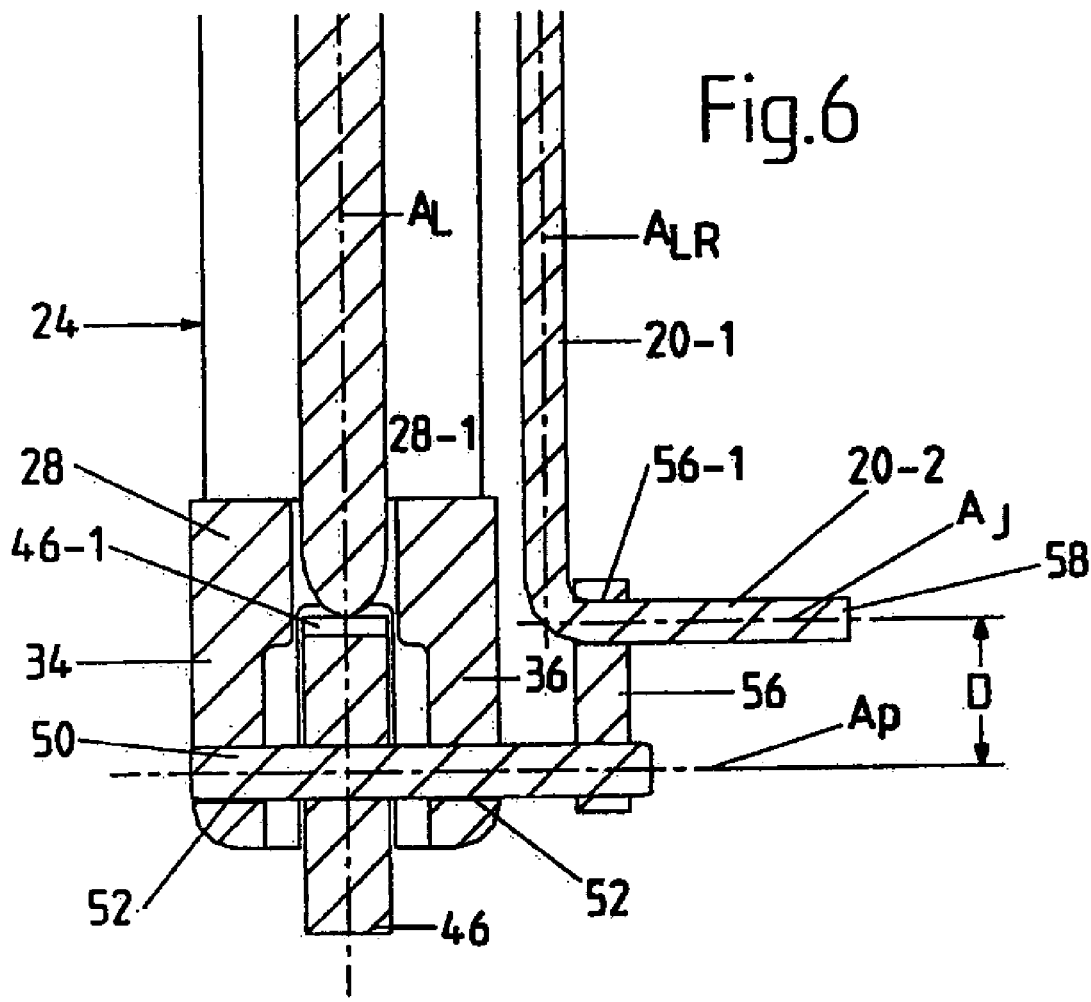
FIG. 6 is a cross-sectional view along line 6—6 of FIG. 5.
Figure 8:
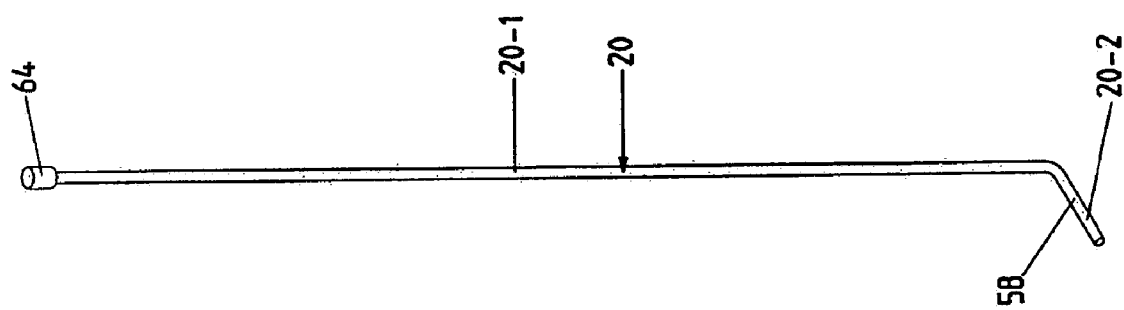
FIG. 8 shows the actuating rod of the level gauge.
Figure 7:
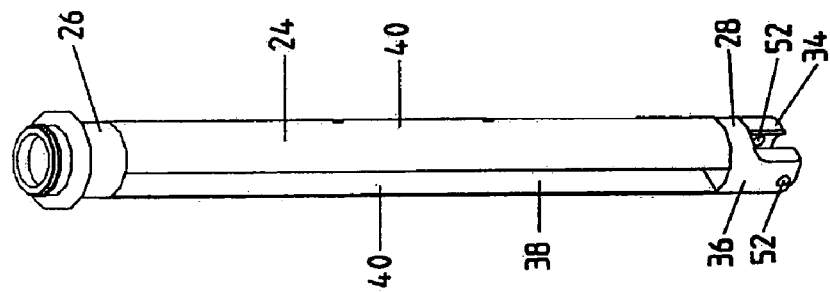
FIG. 7 shows the post of the overfill protection device.

As shown in FIG. 7, the elongate post 24 has an elongate transverse slot 38 extending along a major portion of the length of the post 24 between the upper annular end portion 26 and the lower end portion 28. The slot 38 is defined between two opposite elongate post sections 40, 40 which are segment-shaped in cross-section as best seen in the cross-sectional view of FIG. 5. Referring again to FIGS. 2 and 3 and to FIG. 6, the float 42 of the overfill protection device 14 is mounted on a lever 44 having a cam member 46 at one end and being pivotably mounted between the clevis arms 34 and 36 at the lower free end of the lower end portion 28 of the elongate post 24. A pin member 50 is fixed to the cam member 46 and rotatably mounted in bearing apertures 52 (FIG. 6) formed in the clevis arms 34 and 36. The pin member 50 defines a pivot axis AP (see FIGS. 2 to 6) of the float lever 44 which pivot axis AP is normal to and intersects the longitudinal axis AL of the tap and overfill protection device.

The overfill protection device 14 of the invention is furthermore distinguished from the overfill protection device of FIG. 1 in that the pilot valve element 54 is carried on an elongate stem 57 arranged coaxially with the longitudinal axis AL of the tap 10 and overfill protection device 14. The elongate stem 57 is provided with the pilot valve element 54 at the upper end thereof within the upper end portion 26 of the elongate post 24. The stem 57 is located in the transverse slot 38 and is centered between the segment-shaped portions 40, 40 of the post 24. The lower end of the stem 57 is received and guided in a central opening 28-1 (FIG. 6) of the lower end portion 28 of the post 24 for cooperation with a cam surface 46-1 of the cam member 46.

As with the overfill protection device of FIG. 1, the cam surface 46-1 normally maintains the pilot valve element 54 in an open position, but when the float 42 pivots sufficiently upwardly for the elongate stem 57 to enter at its lower end into a cutout portion or depression 46-2 formed in the cam member 46 to cause downward movement of stem 57, the pilot valve will be closed by engagement of the pilot valve element 54 with a seat ring 27 provided in the upper end portion 26 of the guide post 24. The gas pressure will now build up in a valve chamber defined between the pilot valve element 54 and the valve piston 55 in the tubular member 30 to move the valve piston 55 into its closed position.

Accordingly, it can be seen that the overfill protection device 14 of the invention is distinguished from the overfill protection device of FIG. 1 by the elongate post 24 and the elongate stem 57. The elongate post 24 and stem 57 allow for the pivotably mounted float 42 to be spaced further downwardly away from the tap body 16 and deeper in the vessel 12 towards the bottom end thereof when the tap 10 is fixed to the vessel 12.

The tubular member 30 and the elongate post 24 can be considered to form together an elongate support leg for the pivotable float 42. The support leg has a total length to extend deeply into the vessel 12 so that the level gauge 18 is operative to detect a wide range of liquid levels between a maximum fill level (note the full line position of the float 42 in FIG. 2) and a low level (note the dotted line position of the float in FIG. 2) close to the bottom of the vessel 12.

The level gauge 18 will now be described in greater detail with reference to FIGS. 2 to 10.

Referring first to FIG. 2, the level gauge 18 comprises an elongate rod 20 extending generally in the direction of the longitudinal axis AL and positioned in close proximity externally of and alongside the elongate post 24 and the tubular member 30 of the overfill protection device 14.

Figure 4:
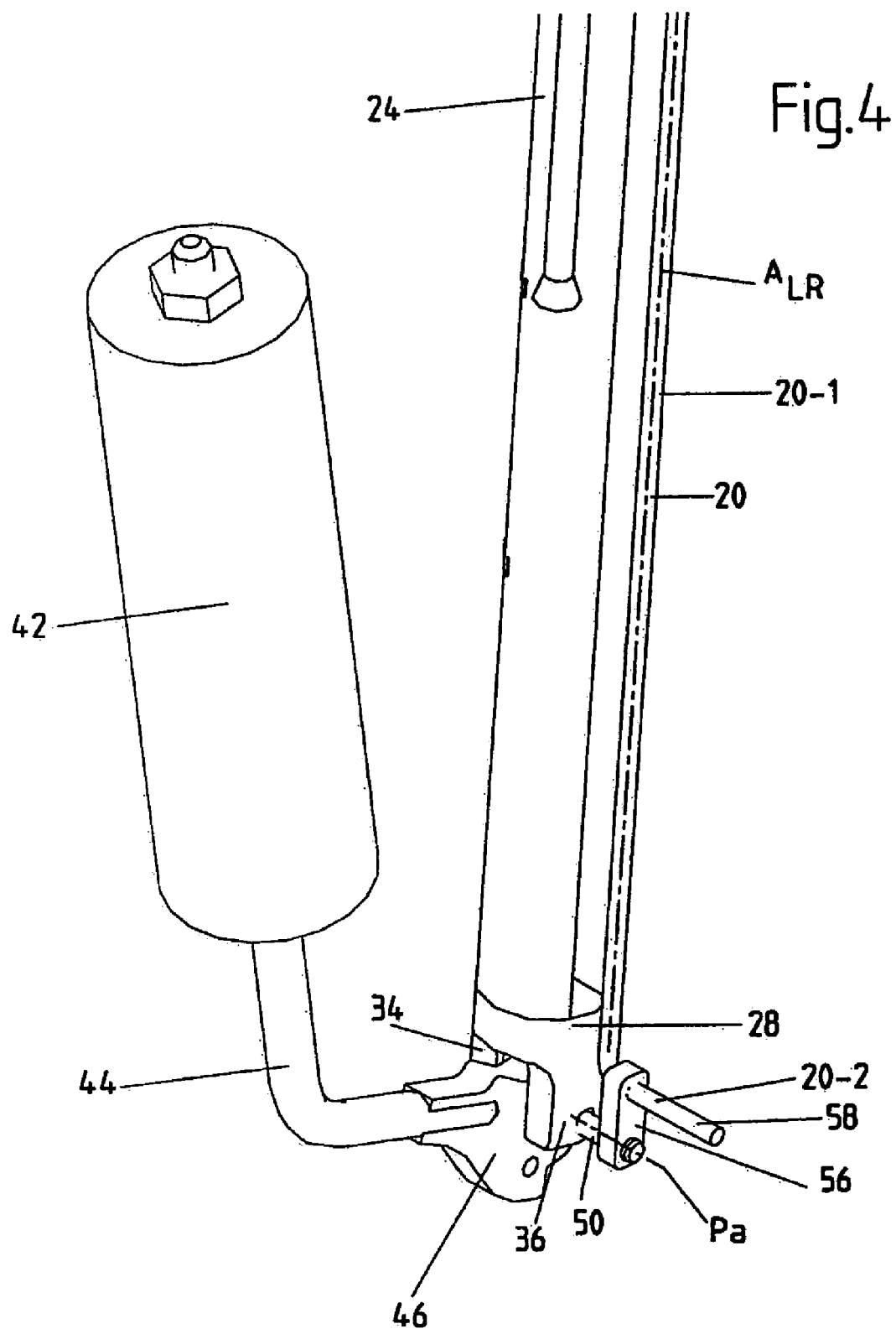
FIG. 4 shows the lower end portion of the elongate guide post of the overfill protection device, the pivotable float and the lower end portion of the crank actuated rod of the level gauge.
Figure 5:
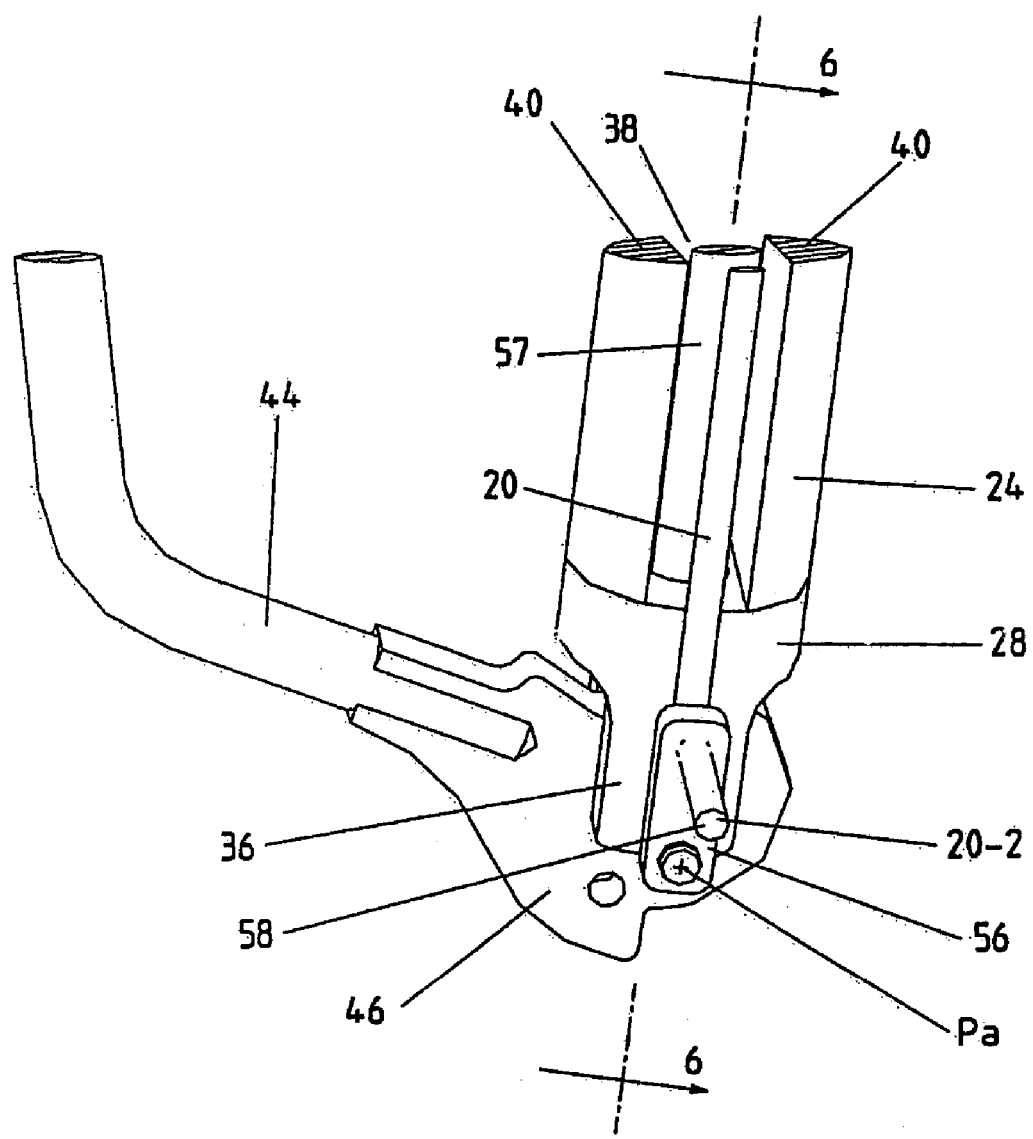
FIG. 5 shows in perspective view the pivot mounting of a float lever at the lower end of the post of the overfill protection device, as well as the actuation cam for the actuating stem of the overfill protection device and actuating crank for the rod of the level gauge.

As shown in FIGS. 4, 5, 6 and 8 the rod 20 is generally L-shaped having a long, generally vertically extending arm 20-1 and a short horizontal arm 20-2 forming an angle of about 90 degrees with the long vertical arm 20-1. The short arm 20-2 extends from the long arm 20-1 radially outwardly away from the post 24. The short horizontal arm 20-2 serves as a cranked journal end 58 rotatably engaged in an opening 56-1 of a crank arm 56 fixedly secured to an end portion of the pin 50 extending axially outwardly beyond the clevis arm 36. The crank arm 56 may be threadably engaged (note FIG. 4) with the pin 50 but may be otherwise secured to pin 50 for rotation therewith. For example, the crank arm 56 may be integrally formed in one piece of pin 50. As shown in FIG. 6 the cranked journal end 58 has an horizontal axis AJ and is rotatably engaged in the opening 56-1 of the crank arm 56. The horizontal journal axis AJ is spaced a distance D from the horizontal pivot axis AP of float lever 44.

Figure 9:
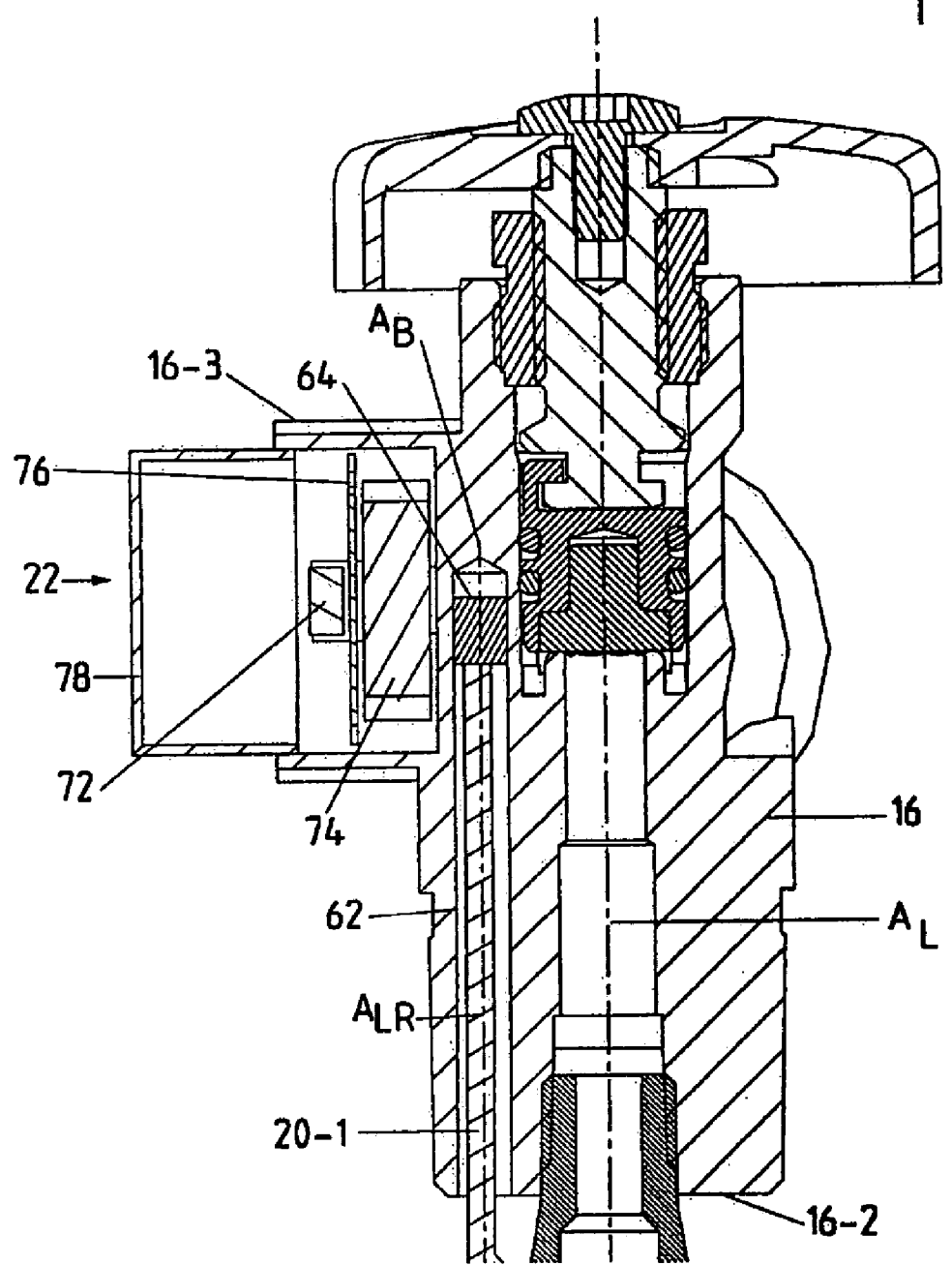
FIG. 9 is a vertical sectional view of the tap body showing the upper end portion of the actuating rod of the level gauge received in the tap body bore and having the permanent magnet attached hereto, as well as a laterally facing mounting socket of the tap body for the level indicator device.

The upper end portion of the long arm 20-1 of the rod 20 is received in a vertical bore 62, note FIG. 9, of the tap body 16, the vertical bore 62 having a longitudinal axis AB generally parallel to the axis AL of the tap body 16 and the overfill protection device 14. For machining reasons the axis AB may be disposed at a small angle of about 2–3 degrees relative to axis AL. A permanent magnet 64 is fixed to the upper end of long arm 20-1 of rod 20, note FIGS. 8 and 9. Accordingly, the upper end of rod arm 20-1 is guided for linear reciprocating motion in bore 62.

In operation, in the maximum fill position of the float 42 shown in full lines in FIG. 2 and also in FIGS. 4, 5 and 6, the crank arm 56 extends generally vertically and is aligned with the vertically extending long arm 20-1 of the rod 20. In this position the crank arm 56 and the long arm 20-1 of the rod 20 are generally parallel to the longitudinal axis AL of the tap body 16 and overfill protection device 14, note FIGS. 2, 4, 5 and 6. When the fluid level in the vessel 12 decreases the float 42 and the float arm 44 pivot counterclockwise about pivot axis AP causing the journal section 58 formed by short arm 20-2 of rod 20 to move downwardly on an arcuate path about pivot axis AP, which arcuate path is spaced radially by distance D from pivot axis AP thereby resulting in a combined swinging and downward longitudinal motion from the position shown in FIGS. 2, 4, 5 and 6. This in turn results in a downward movement of magnet 64 in the tap body bore 62. The rod 20 is displaced in the opposite direction when the liquid level in the vessel 12 increases. In other words, the pivot motion of float arm 44 carrying float 42 is converted into up and down movement of permanent magnet 64 by the crank mechanism coupling float arm 44 to rod 20.

The vertical bore 62 of tap body 16 opens out in the lower end face 16-2 and the bore axis AB is located in a vertical plane containing the longitudinal axis AL of the tap body 16 and the overfill protection device 14 as well as the pivot axis AP.

In another embodiment (not shown) the crank mechanism may be formed so that the rod 20 is shifted or displaced upwardly in response to downward pivot motion of float 42.

It is noted that the rod 20 extends snuggly adjacent the exterior circumferential surface of the stem 24 and the tubular member 30 so that it can be inserted through the small diameter vessel opening 12-1 when the tap body base end 16-1 is threaded into said vessel opening 12-1. It can also be seen that the float 42 actuates both the stem 57 of the overfill protection device 14 and also the rod 20 of the level gauge 18 to displace both the stem 57 and the rod 20 axially of the longitudinal axis AL.

Referring further to FIG. 9, it can be seen that the tap body 16 has a laterally extending mounting sleeve 16-3 defining a socket 16-3 for receiving the level indicator device 22 therein. The level indicator or display device 22 has a rotatable pointer 72 carried by a second permanent magnet 74 and a stationary dial disc 76. The pointer 72 and the second permanent magnet 74 are rotatably mounted on a pin (not shown) of a cap member 78 insertable into the socket 16-3. The cap member 78 has an internal rib 78-1 (FIG. 2) engaging a cutout 80 (FIG. 10) of the dial disc 76 to retain it against rotation. For assembling, the indicator device 22 comprising the pointer 72, the magnet 74 and the disc 76 are placed on the pin (not shown) of the cap 78 and the cap 78 is then inserted into the tap body sleeve 16-3. Note that in FIG. 9 the cap 78 is shown in a partly retracted position. In the mounted position the cap 78 is substantially totally received within the sleeve 16-3. Furthermore, it is noted that no support means for the magnet 74, the pointer 72 and the disc 76 are provided on the tap body 16. On the outwardly facing surface of the dial disc 76 there is provided a scale 82 (FIG. 2). In operation the pointer 72 is movable relative to the scale 82 to indicate the level of the liquid gas in the vessel 12.

Figure 10:
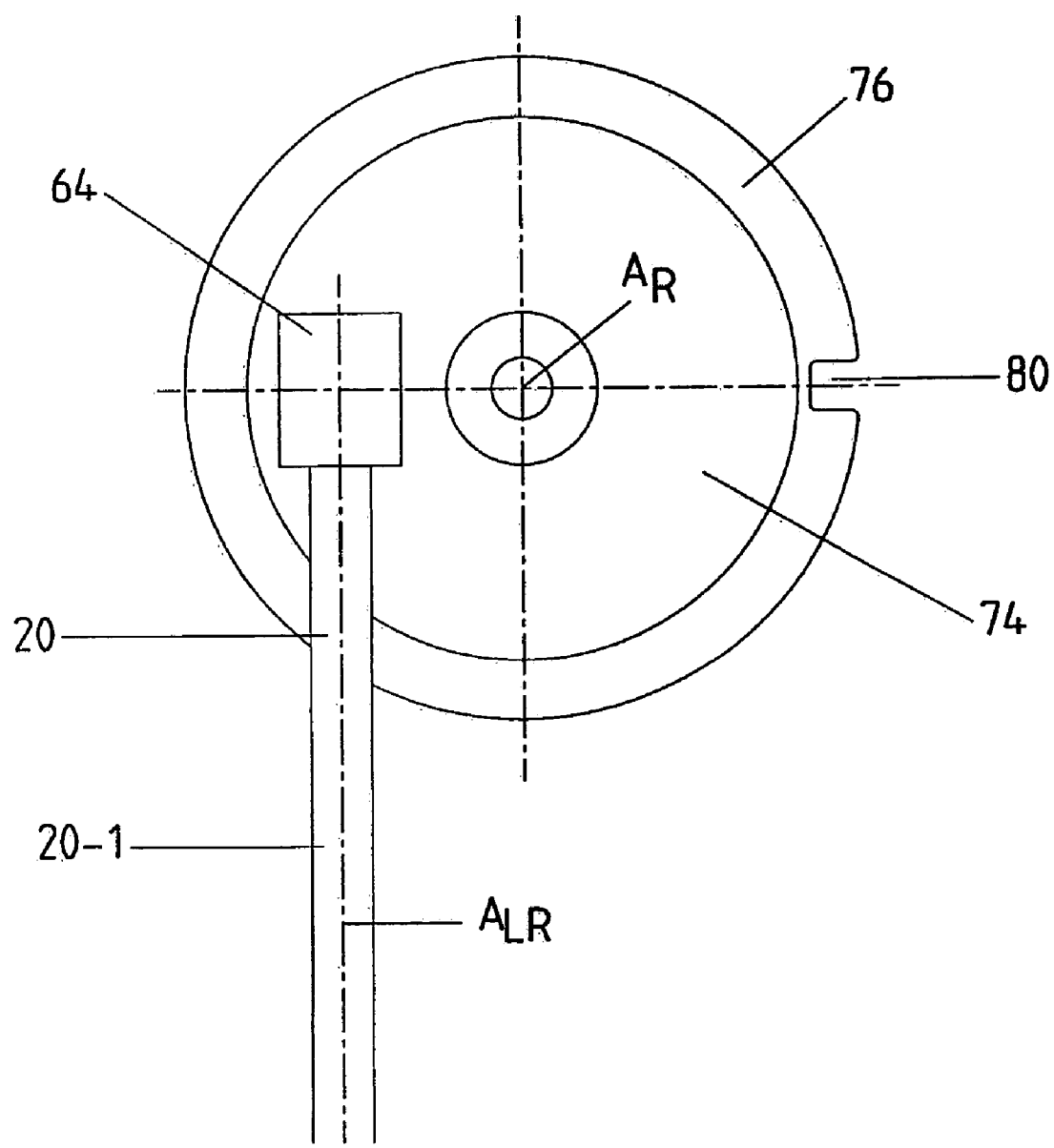
FIG. 10 is a representation of the disposition of the longitudinally movable level gauge actuating rod with respect to the rotatable magnet of the pointer member.

FIG. 10 shows the relative position of the first permanent magnet 64 provided on the upper end 60 of the rod 20 and the second permanent magnet 74 carrying the pointer 72. It can be seen that the longitudinal axis AL of the rod 20 is laterally spaced from the axis of rotation AR of the second permanent magnet 74 and pointer 72. Accordingly, when magnet 64 moves axially upwardly and downwardly it causes a rotation of the second permanent magnet 74 about axis of rotation AR by a magnetic coupling force. It is further pointed out that the axis AR crosses the longitudinal axis ALR of the long arm 20-1 of the rod 20 in laterally spaced apart relationship and forms, in the embodiment shown in the drawings, an angle of about 90° with the longitudinal axis ALR but in other embodiments the axis of rotation AR may be inclined upwardly relative to the rod axis ALR to permit an upward inclination of the indicator device 22.

Figure 11:
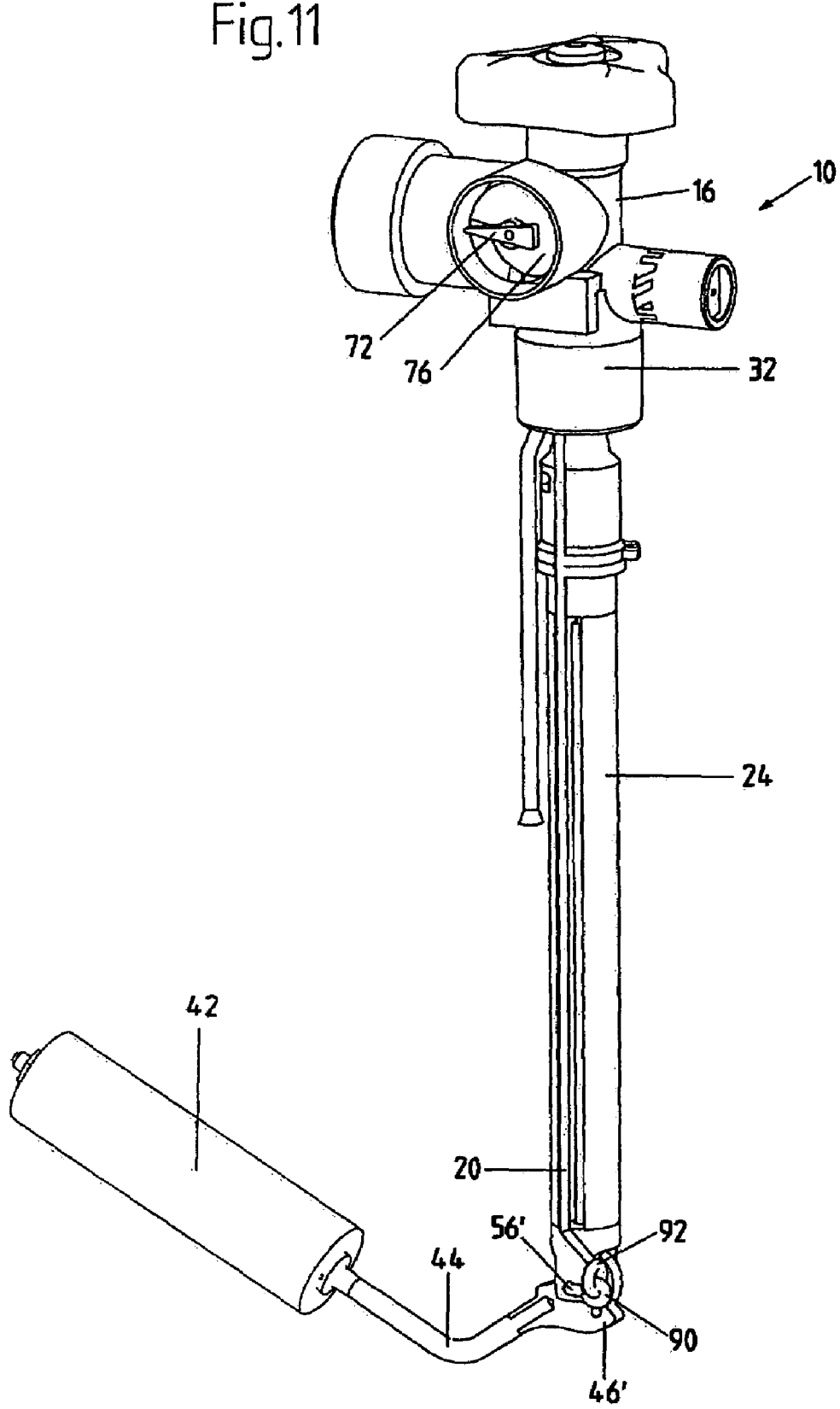
FIG. 11 is a perspective view of another embodiment of the tap with overfill protection device and level gauge, showing a first alternate embodiment of the motion transmitting means for moving the level gauge rod longitudinally in response to pivot motion of the float.
Figure 12:
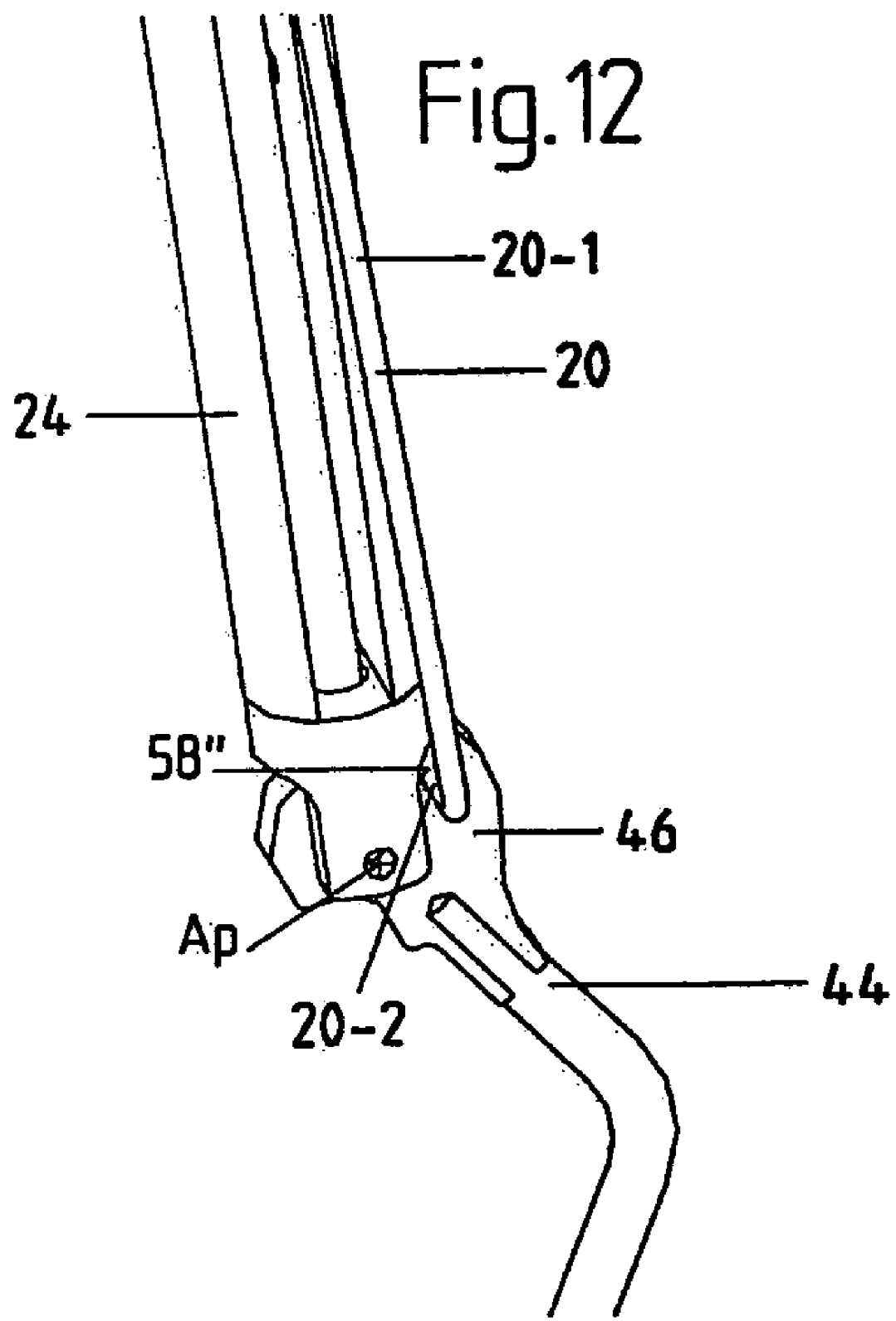
FIG. 12 shows a second alternate embodiment of the motion transmitting means for moving the level gauge rod longitudinally in response to pivot motion of the float.

As described hereinbefore with respect to the embodiment of FIGS. 2–10, the motion transmitting means for axially moving the rod 20 relative to the post 24 in response to pivot motion of the float 42 about the pivot axis AP of pin 50 comprises a crank arm 56 on pin 50 and an angled journal 58 of the rod 20 rotatably received in the crank arm 56. However, the mechanism for axially moving the rod 20 relative to the post 24 may have different forms, as shown for example in FIGS. 11, 12 and 13. In FIG. 11, the crank arm 56' fixed to the pivot pin (not shown in FIG. 11) has at its free end a first ring member 90 at a radial distance from pivot axis AP and the lower end of the rod 20 has an angled or skewed lower end section having at its free end a second ring member 92 engaged in ring member 90. The ring members 90 and 92 engaging one another like two chain elements. In FIG. 12, the cranked journal end 58" at the lower end of the rod 20 extends from the lower end of the long arm 20-1 of the rod 20 towards the cam member 46 of the float arm 44 and is directly engaged in an opening (spaced radially from pin axis AP) of the cam member 46. The operation of the embodiment of FIGS. 11 and 12 is generally the same as for the embodiment of FIGS. 2 to 10.

Referring now to FIGS. 13 and 13A; FIG. 13 is a longitudinal sectional view of the tap assembly (only the lower portion of the tap body being shown) with OPD and level gauge, and FIG. 13A is a view taken in the direction of arrows 13A—13A of FIG. 13 and showing only the lower end portion of the gauge rod 20A and its actuating cam 96.

In FIGS. 13 and 13A the rod 20A is actuated by a separate cam member 96 mounted on pin 50A. In this embodiment the rod 20A does not effect a swinging movement, but the rod 20A is held generally parallel to the support leg (consisting of post 24 and tubular member 30) and the actuating stem 57. The lower end portion of the gauge rod 20A may be retained and guided in an opening formed in a radial ear 98 of the support leg. A spring 100 may be disposed in the tap body bore 62 above the magnet 64 to urge the rod 20A downwardly into engagement with the cam 96. A cranked journal at the lower end of the rod 20A is not needed.

Other means for axially moving the rod 20 relative to the post 24 in response to pivot motion of the float 42 can be conceived by one skilled in the art.

Figure 14:
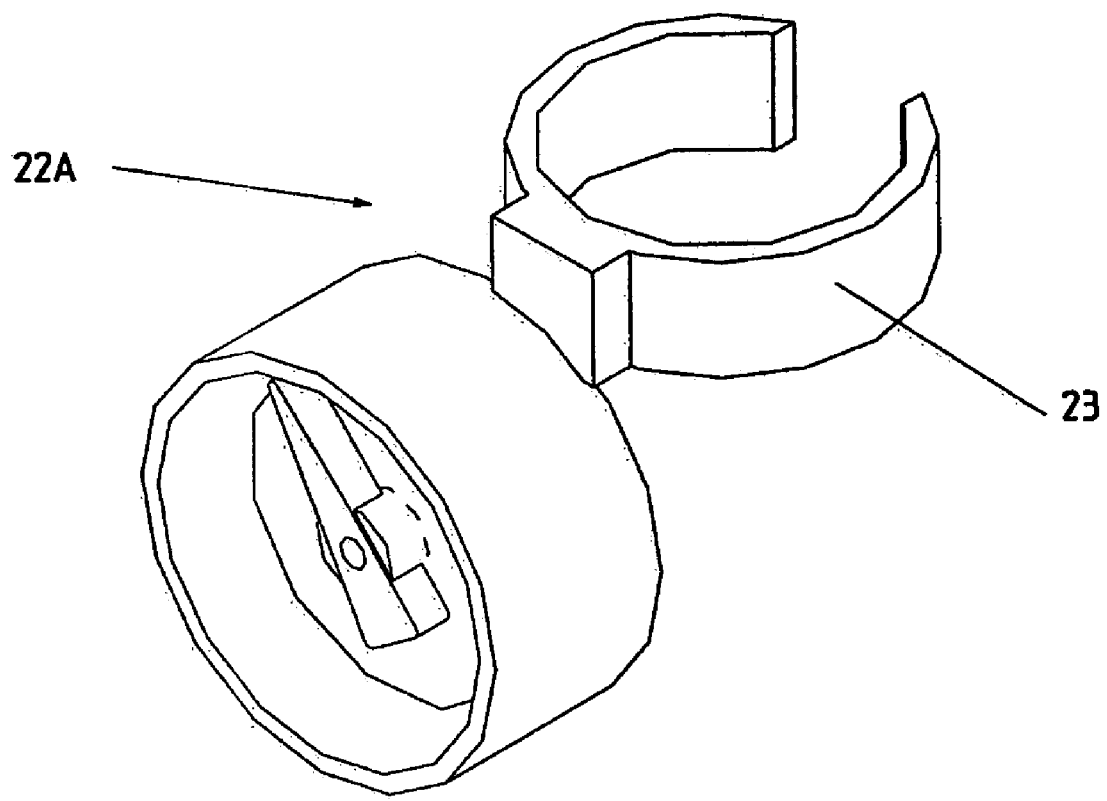
FIG. 14 is a perspective view of the level indicator having a clip ring for snapping the indicator on the tap body.

In FIG. 14 there is shown a clip-on level indicator 22A having a split resilient clip-ring 23 to be snapped on the body of the tap assembly (not shown). In an embodiment using this clip-on level indicator 22A the tap body does not need to be provided with the socket 16-3 shown in FIG. 9.

Figure 15:
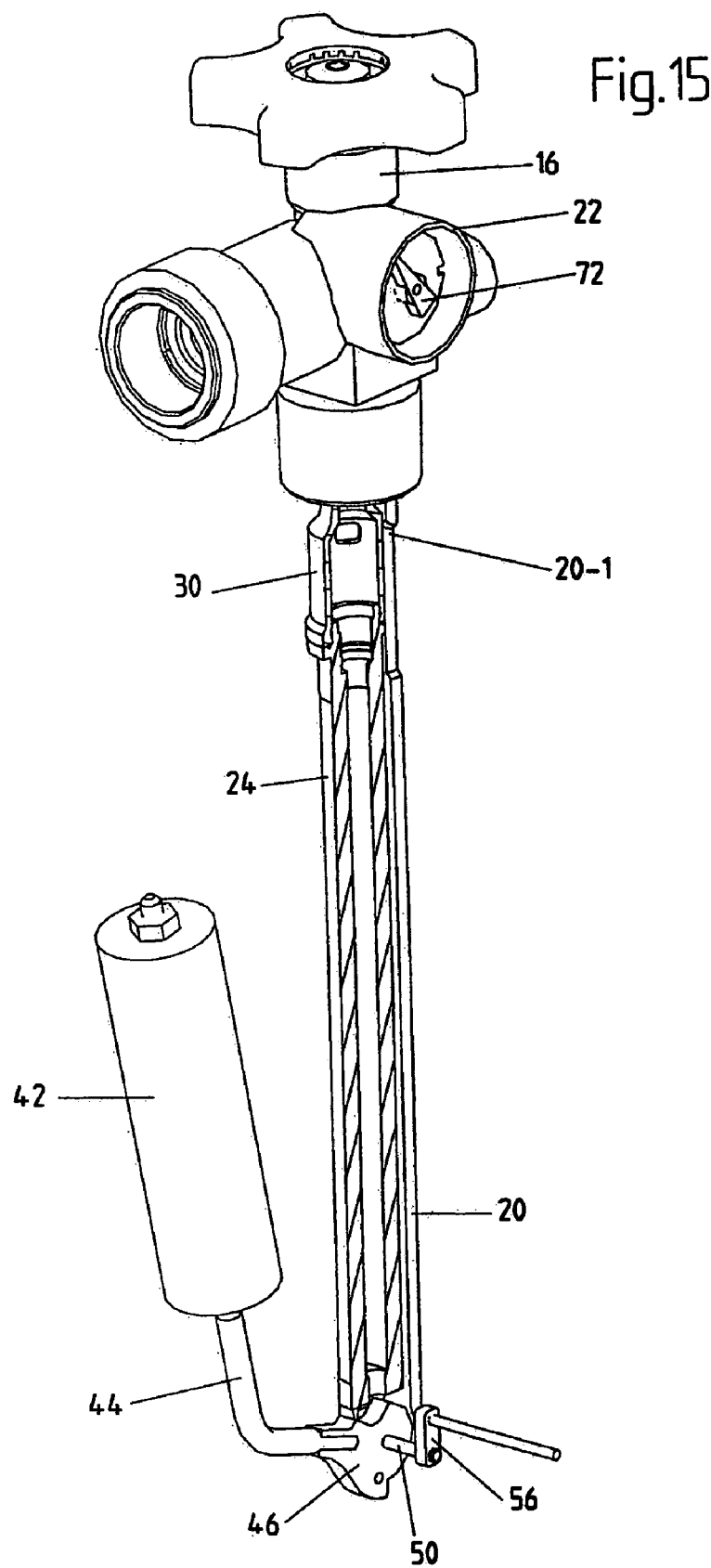
FIG. 15 shows a tap assembly with a level gauge of the invention, but without OPD.

FIG. 15 discloses a tap assembly 10' without overfill protection device, there being no stem, pilot valve and piston member in the elongate support leg (consisting of post 24 and tubular member 30) fixed at its upper end to the tap body and carrying the pivotably mounted float at the lower end thereof. The level gauge of the valve assembly without OPD of FIG. 14 is identical to the embodiment of the level gauge shown in FIGS. 2–10.

In FIG. 15 the float 42, the float lever 44 and the cam member 46 are shown pivoted leftwardly from the normal operative position thereof to permit a clear showing of the support leg and the level gauge. Further, in FIG. 15 the right side clevis arm in which the pin 50 is pivotably mounted is not shown.

Although in FIG. 15 the support leg is shown to be the same as in the embodiment of FIGS. 2–10, comprising the tubular section 30 and the support post 24, the support leg may be (in an embodiment not shown in the drawings) a single solid member having at its upper end flow passage means to provide communication between flow passage means of the tap body and the interior of the gas cylinder to permit fluid flow from the tap body through the support leg into the gas cylinder and out from the gas cylinder through the support leg into the gas tap body.

Further, while in the embodiment of FIG. 15 the gauge rod 20 is shown to be disposed externally of the support leg, in another embodiment not shown in the drawings, a lower portion of the gauge rod may be disposed within the support leg and interconnected by an angled section of the rod with the upper portion of the rod disposed externally of the support leg and extending into the gas tap body bore (such as bore 62 in FIGS. 9 and 13). The angled section of the gauge rod interconnecting the lower portion and the upper portion of the gauge rod may extend from within the support leg through a vertical slot thereof to the exterior of the support leg. In such an embodiment the gauge rod (without cranked journal end) can be actuated by a cam pivotable with the float lever, as shown in FIGS. 13 and 13A, but with the cam mounted on the pivot pin 50 between the clevis arm 34, 36. A spring (such as spring 100 of FIGS. 13, 13A) may be provided to urge the gauge rod downwardly in engagement with the actuating cam.

While the invention has been described hereinbefore in great detail with respect to the preferred embodiments shown in the drawings, several variations and modifications may be made thereto by one skilled in the art within the scope of the invention as defined by the annexed claims.

The invention claimed is:

1. A tap assembly for a liquid vessel such as a liquefied gas cylinder, comprising:
   a tap body having a longitudinal axis and a base end portion for securing said tap in an opening of the liquid vessel;
   an overfill protection device mounted on said tap body and being effective to prevent filling of said vessel beyond a predetermined maximum liquid level, said overfill protection device comprising:
   a float controlled fluid flow control means; and said tap assembly further comprising:
   a level gauge, said level gauge comprising:
   a. a pivotable float lever having a float fixed thereto and being mounted on a fixed structure of said tap assembly;
   b. an elongate gauge rod extending generally longitudinally of said axis, said gauge rod having one of its ends located adjacent a pivot axis of said float lever and the other end of said gauge rod being received and guided for reciprocating movement within a bore formed in said tap body, said bore being generally parallel to said longitudinal axis;
   c. motion transmitting means comprising a crank mechanism coupling said float lever and said one end of said gauge rod for generally longitudinally shifting said gauge rod in response to pivot motion of said float lever and said float caused by variations of said liquid level between a minimum liquid level in said vessel and said maximum level; and d. a permanent magnet carried by said gauge rod for movement with said rod in said tap body bore to actuate a liquid level indicator means.

2. The tap assembly according to claim 1, wherein said crank mechanism causes constrained positively driven displacement of said one end of said gauge rod both in one direction and in an opposite direction on an arcuate path about said pivot axis of said float lever in response to clockwise and counterclockwise pivot motion of said lever to thereby cause said gauge rod to effect a swinging motion while being shifted longitudinally and to convert pivot motion of said float lever to reciprocating motion of said permanent magnet.

3. The tap assembly according to claim 2, wherein said float lever has a hinge pin fixedly secured thereto for pivotal motion therewith about said pivot axis, said crank mechanism comprising said hinge pin and a crank arm provided on said hinge pin and to which said gauge rod is pivotably connected at a location spaced radially from said hinge pin.

4. The tap assembly according to claim 3, wherein said gauge rod has at said one end thereof a cranked journal end disposed generally perpendicularly to a longitudinal axis of the rod and pivotably received in an opening of said crank arm.

5. The tap assembly according to claim 2, wherein said crank mechanism comprises first and second ring members interengaged within one another, and a crank arm being provided on a hinge pin rotatable with said float lever about said pivot axis, said crank arm being rotatable with said hinge pin and having one of said ring members fixed thereto at a location spaced radially from said pivot axis and the other ring member being fixed to said gauge rod.

6. The tap assembly according to claim 2, wherein said crank mechanism comprises a cranked journal end at said one end of said gauge rod pivotably connected to said float lever at a position radially spaced from said pivot axis.

7. The tap assembly according to claim 4, wherein said rod is L-shaped having a long arm and a short arm, said long arm having said magnet provided at a free end thereof and said short arm forming said cranked journal end.

8. The tap assembly according to claim 6, wherein said rod is L-shaped having a long arm and a short arm, said long arm having said magnet provided at a free end thereof and said short arm forming said cranked journal end.

9. The tap assembly according to claim 1, wherein the indicator means is adapted to be mounted on said tap body, said indicator means being actuatable by said permanent magnet carried by said gauge rod.

10. The tap assembly according to claim 9, wherein the indicator means is adapted to be releasably mounted on the tap body.

11. The tap assembly according to claim 9, wherein said indicator means has a pointer member having a rotatable permanent magnet operatively connected thereto, said pointer member and said rotatable permanent magnet being rotatable about an axis crossing in laterally spaced relationship a longitudinal axis of an end portion of said rod received in said tap body.

12. The tap assembly according to claim 1, wherein said fixed structure comprises a support leg secured to said tap body and including an elongate guide post for an elongate actuating stem of said overfill protection device, said guide post having a first annular end portion at an end proximal to the tap body, a second end portion at an end located distally from the tap body, and two elongate parallel post sections transversely spaced from one another, extending between said end portions in longitudinal direction of the post to define a central longitudinal slot therebetween, said elongate stem being coaxially disposed in said post and having one end thereof received and guided in said second end portion, the other end of said elongate stem being received in said first annular end portion of said guide post.

13. The tap assembly according to claim 12, wherein said one end of said stem is adapted to engage a cam surface provided on said float lever and the other end of said stem comprises a pilot valve element of said of said fluid flow control means, said pilot valve element cooperating with a pilot valve seat in the first annular end portion of said guide post.

14. The tap assembly according to claim 13, wherein a tubular member is interposed between said tap body and said guide post, there being disposed a piston member of said control means in said tubular member movable into a closed position to stop filling of said vessel.

15. The tap assembly according to claim 12, wherein said float lever is pivotably connected to said second end portion of said post.

16. A tap assembly for a liquid vessel such as a liquefied gas cylinder, comprising;
 a tap body having a longitudinal axis and a base end portion for securing said tap in an opening of the liquid vessel;
 an overfill protection device mounted on said tap body and being effective to prevent filling of said vessel beyond a predetermined maximum liquid level, said overfill protection device comprising:
 a float control fluid flow control means; said tap assembly further comprising:
 a level gauge, said level gauge comprising:
 a. a pivotable float lever having a float fixed thereto and being mounted on a fixed structure of said tap assembly;
 b. an elongate gauge rod extending generally longitudinally of said axis, said gauge rod having one of its ends located adjacent a pivot axis of said float lever and the other end of said rod being received and guided for reciprocating linear movement within a bore formed in said tap body, said bore being generally parallel to said longitudinal axis, said gauge rod being held parallel to said actuating stem and said support leg;
 c. motion transmitting means comprising a cam member fixed to a rotatable hinge pin of said float lever and engaging said one end of said gauge rod for longitudinally shifting said gauge rod in response to pivot motion of said float lever and said float caused by variations of said liquid level between a minimum liquid level in said vessel and said maximum level; and
 d. a permanent magnet carried by said gauge rod for movement with said gauge rod in said tap body bore to actuate a liquid level indicator means.

17. The tap assembly according to claim 16 and further including a spring for urging said gauge rod towards said cam member.

18. The tap assembly according to claim 16, wherein the indicator means is adapted to be mounted on said tap body, said indicator means being actuatable by said permanent magnet carried by said gauge rod.

19. The tap assembly according to claim 18, wherein the indicator means is adapted to be releasably mounted on the tap body.

20. The tap assembly according to claim 18, wherein said indicator means has a pointer member having a rotatable permanent magnet operatively connected thereto, said pointer member and said rotatable permanent magnet being rotatable about an axis crossing in laterally spaced relationship a longitudinal axis of an end portion of said rod received in said tap body.

21. The tap assembly according to claim 16, wherein said fixed structure comprises a support leg secured to said tap body and including an elongate guide post for an elongate actuating stem of said overfill protection device, said guide post having a first annular end portion at an end proximal to the tap body, a second end portion at an end located distally from the tap body, and two elongate parallel post sections transversely spaced from one another, extending between said end portions in longitudinal direction of the post to define a central longitudinal slot therebetween, said elongate stem being coaxially disposed in said post and having one end thereof received and guided in said second end portion, the other end of said elongate stem being received in said first annular end portion of said guide post.

22. The tap assembly according to claim 21, wherein said one end of said stem is adapted to engage a cam surface provided on said float lever and the other end of said stem comprises a pilot valve element of said fluid flow control means, said pilot valve element cooperating with a pilot valve seat in the first annular end portion of said guide post.

23. The tap assembly according to claim 22, wherein a tubular member is interposed between said tap body and said guide post, there being disposed a piston member of said control means in said tubular member movable into a closed position to stop filling of said vessel.

24. The tap assembly according to claim 21, wherein said float lever is pivotably connected to said second end portion of said post.

25. The tap assembly according to claim 1, wherein said float lever has a cam surface for actuating said fluid flow control means of said overfill protection device.

26. The tap assembly according to claim 16, wherein said float lever has a cam surface for actuating said fluid flow control means of said overfill protection device, said cam surface being separate from said cam member.

27. The tap assembly according to claim 6, wherein the pivoted end of the float lever is in the form of a cam for actuating said overfill protection device and the cranked journal end of said gauge rod is connected to said cam at a location radially spaced from said pivot axis.

28. The tap assembly according to claim 1, wherein the fixed structure comprises an elongate support leg secured to said tap body and depending therefrom in the direction of said longitudinal axis, an elongate actuating stem of said overfill protection device being axially movable in said support leg in the direction of said longitudinal axis and effective to actuate said fluid flow control means, said float lever having one end pivotably mounted to said support leg, with said pivoted end being formed as a cam surface for actuating said actuating stem, and said gauge rod extending exteriorly of said support leg closely adjacent thereto.

29. The tap assembly according to claim 16, wherein said fixed structure comprises an elongate support leg secured to said tap body and depending therefrom in the direction of said longitudinal axis, an elongate actuating stem of said overfill protection device being axially moveable in said support leg in the direction of said longitudinal axis and effective to actuate said fluid flow control means, said float lever having one end pivotably mounted to said support leg, with said pivoted end being formed as a cam surface for actuating said actuating stem, said cam surface being separate from said cam member and said gauge rod extending exteriorly of said support leg closely adjacent thereto.

30. A tap assembly for a liquid vessel such as a liquefied gas cylinder, comprising:
a tap body having a longitudinal axis and a base end portion for securing said tap in an opening of the liquid vessel;
an overfill protection device mounted on said tap body and being effective to prevent filling of said vessel beyond a predetermined maximum liquid level, said overfill protection device comprising:
a float controlled fluid flow control means; and said tap assembly further comprising:
a level gauge comprising a pivotable float lever having a float fixed thereto and being mounted on said overfill protection device, an elongate gauge rod having one of its ends drivingly coupled to said float lever at a position adjacent a pivot axis of said float lever and a portion of said gauge rod adjacent the other end thereof being received in a tap body bore extending generally parallel to said longitudinal axis, said one end of said gauge rod being positively driven by said float lever for displacement both in one direction and in an opposite direction on an arcuate path about said pivot axis of said float lever responsive to clockwise and counter-clockwise pivot motion of said float lever caused by variations of said liquid level in said vessel to thereby shift said gauge rod generally longitudinally and reciprocate said portion of said gauge rod in said tap body bore, and a permanent magnet carried by the gauge rod at the other end thereof to actuate a liquid level indicator means.

31. The tap assembly according to claim 30, wherein said float lever has a hinge pin fixedly secured thereto for pivotal motion therewith about said pivot axis, a crank arm extending radially from said hinge pin and said gauge rod being pivotably connected to said crank arm at a location spaced radially from said hinge pin.

32. The tap assembly according to claim 31, wherein said gauge rod has at said one end thereof a cranked journal end disposed generally perpendicularly to a longitudinal axis of the rod and pivotably received in an opening of said crank arm.

33. The tap assembly according to claim 30, comprising a crank arm provided on a hinge pin rotatable with said float lever about said pivot axis, said crank arm being rotatable with said hinge pin and having one of a pair of interengaged ring members fixed thereto at a location spaced radially from said pivot axis, the other ring member being fixed to said gauge rod.

34. The tap assembly according to claim 30, wherein said one end of said gauge rod is pivotably connected to said float lever at a position radially spaced from said pivot axis.

35. The tap assembly according to claim 34, wherein the pivoted end of the float lever is in the form of a cam having a cam surface for actuating said overfill protection device and said one end of said gauge rod is connected to said cam at a location radially spaced from said pivot axis.

36. The tap assembly according to claim 30, wherein the indicator means is adapted to be mounted on said tap body, said indicator means being actuatable by said permanent magnet carried by said gauge rod.

37. The tap assembly according to claim 36, wherein the indicator means is adapted to be releasably mounted on the tap body.

38. The tap assembly according to claim 36, wherein said indicator means has a pointer member having a rotatable permanent magnet operatively connected thereto, said pointer member and said rotatable permanent magnet being rotatable about an axis crossing in laterally spaced relationship a longitudinal axis of an end portion of said rod received in said tap body.

39. The tap assembly according to claim 30, wherein said fixed structure comprises a support leg secured to said tap body and including an elongate guide post for an elongate actuating stem of said overfill protection device, said guide post having a first annular end portion at an end proximal to the tap body, a second end portion at an end located distally from the tap body, and two elongate parallel post sections transversely spaced from one another, extending between said end portions in longitudinal direction of the post to define a central longitudinal slot therebetween, said elongate stem being coaxially disposed in said post and having one end thereof received and guided in said second end portion, the other end of said elongate stem being received in said first annular end portion of said guide post.

40. The tap assembly according to claim 39, wherein said one end of said stem is adapted to engage a cam surface provided on said float lever and the other end of said stem comprises a pilot valve element of said fluid flow control means, said pilot valve element cooperating with a pilot valve seat in the first annular end portion of said guide post.

41. The tap assembly according to claim 40, wherein a tubular member is interposed between said tap body and said guide post, there being disposed a piston member of said control means in said tubular member movable into closed position to stop filling of said vessel.

42. The tap assembly according to claim 39, wherein said float lever is pivotably connected to said second end portion of said post.

43. The tap assembly according to claim 30, wherein said fixed structure comprises an elongate support leg secured to said tap body and depending therefrom in the direction of said longitudinal axis, an elongate actuating stem of said overfill protection device being axially movable in said support leg in the direction of said longitudinal axis and effective to actuate said fluid flow control means, said float lever having one end pivotably mounted to said support leg, with said pivoted end being formed as a cam having a cam surface for actuating said actuating stem, and said gauge rod extending exteriorly of said support leg closely adjacent thereto.

* * * * *